J. B. ADAMS.
RESILIENT TREAD WHEEL.
APPLICATION FILED SEPT. 2, 1909.

980,855.

Patented Jan. 3, 1911.

2 SHEETS—SHEET 1.

Witnesses

Inventor
John B. Adams
By Attorneys

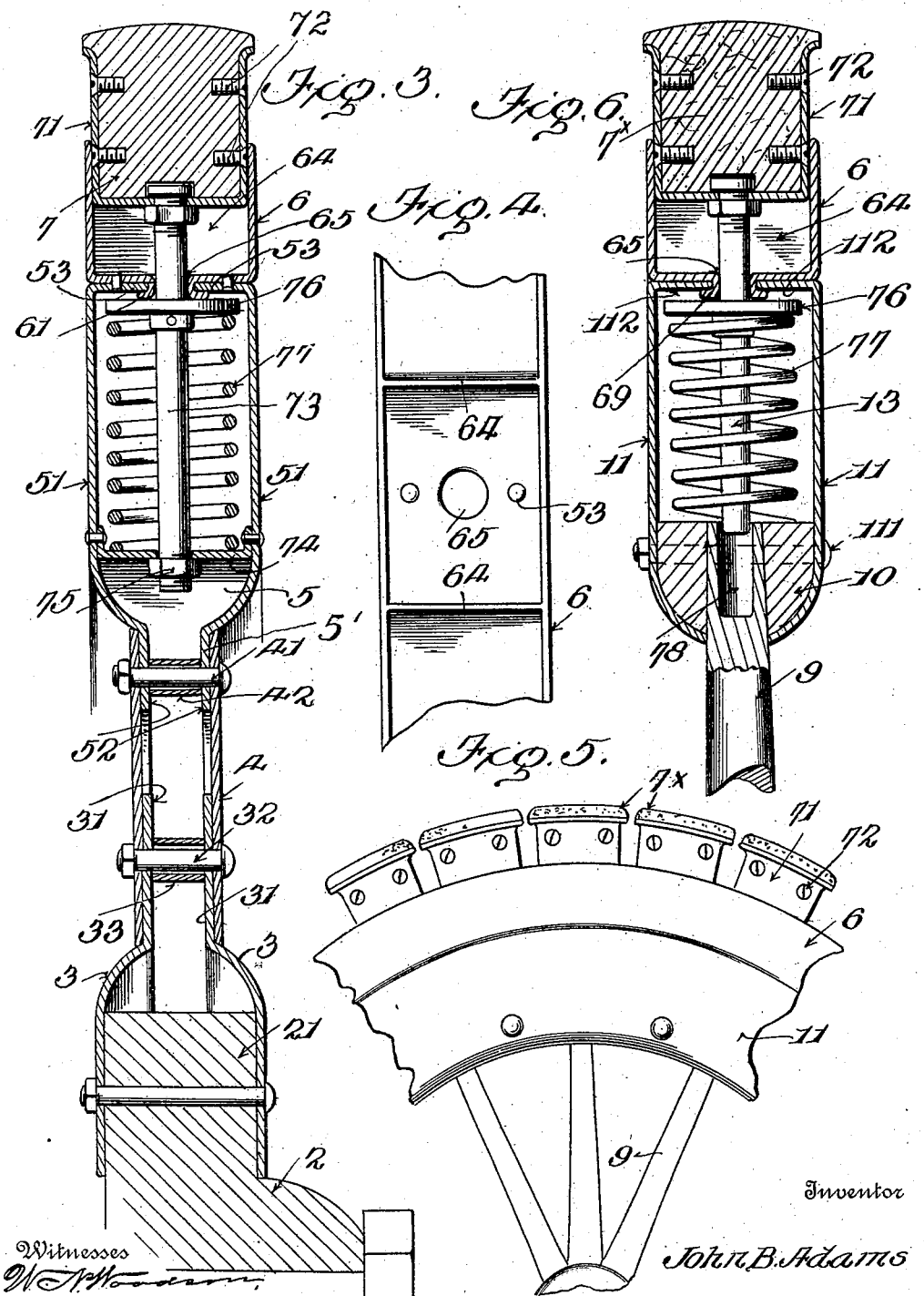

UNITED STATES PATENT OFFICE.

JOHN B. ADAMS, OF LACONIA, NEW HAMPSHIRE.

RESILIENT-TREAD WHEEL.

980,855.  Specification of Letters Patent.  Patented Jan. 3, 1911.

Application filed September 2, 1909. Serial No. 515,839.

*To all whom it may concern:*

Be it known that I, JOHN B. ADAMS, a citizen of the United States, residing at Laconia, in the county of Belknap and State of New Hampshire, have invented certain new and useful Improvements in Resilient-Tread Wheels, of which the following is a specification.

My invention relates to wheels for vehicles, and particularly to one in which the tread portion of the wheel is resiliently supported upon the wheel proper so that as the wheel revolves over the ground, the tread portion thereof will resiliently yield, thereby taking up shock, the wheel being so constructed, however, that while it has the resilient qualities of a pneumatic wheel, yet it is unpuncturable and not subject to the damage to which a pneumatic wheel is liable.

Figure 1:
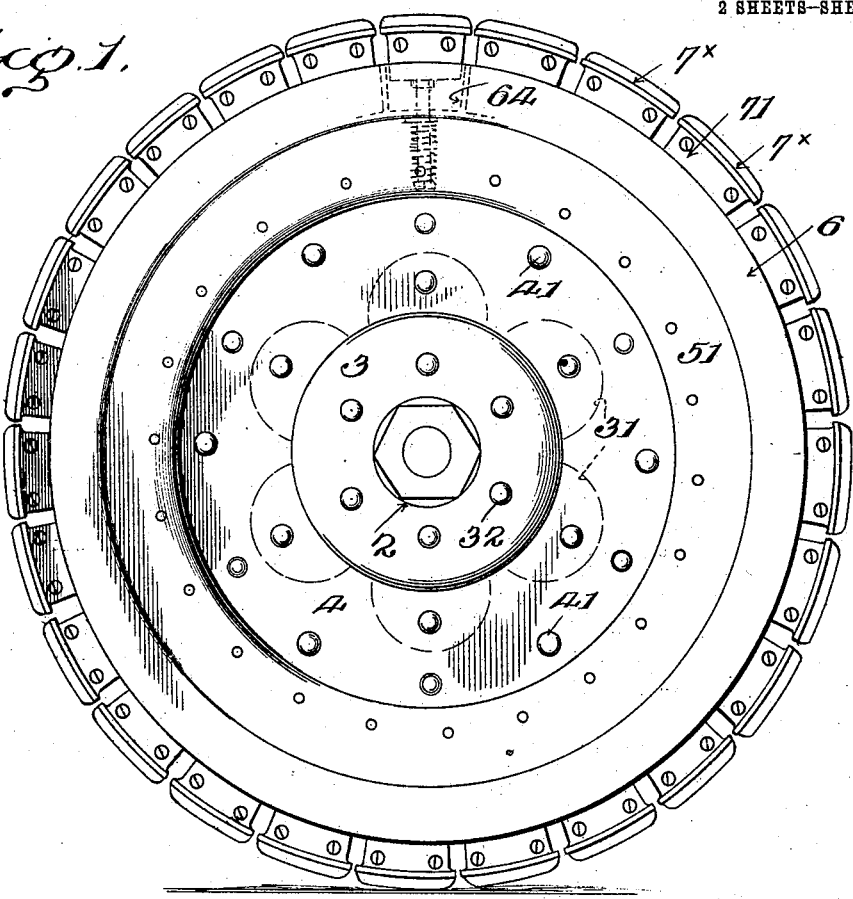
Figure 2:
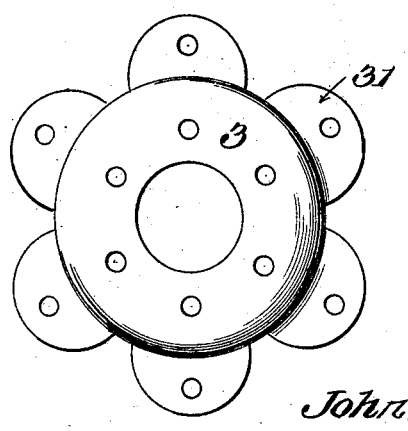

Two forms of my invention are shown in the accompanying drawings, wherein:

Figure 1 is a side view of one form of my wheel; Fig. 2 is a side view of the hub plates 3; Fig. 3 is a diametrical section from the hub to the circumference of the wheel shown in Fig. 1; Fig. 4 is a plan view of the channel iron in which the tread blocks operate; Fig. 5 is a fragmentary side elevation of a modification, and Fig. 6 is a diametrical section thereof.

Corresponding and like parts are referred to in the following description and indicated in all the views of the drawings by the same reference characters.

Referring to Figs. 1 to 4, 2 designates a hub of any usual character, having the annular flange 21. 3 designates opposed plates bolted to the annular flange, the outer margins of the plates being curved toward each other and there formed with flanges 31. 4 designates opposed annular plates forming what may be termed the middle section of the wheel between the hub and the felly. 5 designates a hollow felly formed of opposed plates 51. These plates, on their inner margins, are curved inwardly toward each other and formed with the flanges 52. The outer margins of the plates 5 are formed with inwardly turned flanges 53. The plates 3 are held to the inner margins of the plates 4 by bolts 32 passing through spacing sleeves 33. Preferably, the plates 3 are formed upon their margins with a series of semicircular flanges or ears 31, through which the bolts 32 pass. The outer margins of the plates 4 are bolted to the opposed plates 51 of the hollow felly by bolts 41 passing through spacing sleeves 42. 6 designates an annular channel iron attached to the inwardly turned flanges 53 in any suitable manner. This annular channel plate is separated by a series of partitions 64 into a plurality of dash pot chambers. The inner face of the annular channel bar 6 is perforated, as at 65, beneath each of the chambers formed by the partition 64. The lower face or bottom of said channel iron is formed with the outwardly turned flanges 61 which are adapted to engage with the inwardly turned flanges 53 so that the channel iron 6 is held rigidly in place upon the felly of the wheel. Mounted in each of the compartments formed by the transverse partitions 64 in the channel iron 6, are the tread blocks 7. These tread blocks, which may be of steel, rubber, or other suitable material, are carried within an annular U-shaped casing 71. As shown in Fig. 5, rubber is used for the tread block, and held in place by screws 72 passing through the exterior of the casing and into the tread block. In Fig. 6, a tread block of steel is shown, which may be also held in the casing by the screws 72, the steel tread block being indicated by the numeral $7^x$. Attached to the tread block, and projecting through the opening 65 and into the hollow felly 5, is the plunger spindle 73 which passes between the inwardly turned flanges 53 and through a plate 74 bolted to the plates 51 near their inner margins, as shown in Fig. 3. The extremity of the plunger spindle 73 is provided with the head 75 which prevents the withdrawal of the plunger spindle and the tread block from engagement with the felly of the wheel. Fixedly mounted on the plunger spindle 73 is the head 76 which may be held in place upon the plunger rod or spindle by means of a pin or in any other suitable manner. A coil spring 77 surrounds the plunger rod and is supported at its inner end upon the plate 74. The upper end of the spring bears against the head 76 so that the spring forces the plunger rod and the tread block outward. It will be obvious of course that the plunger rod and tread block may be forced inward against the force of the spring. It will also be seen that the plunger rod is held firmly in opposed bearings formed by the opening 65 in the channel iron 6 and by the opening through the plate 74 through which the plunger rod passes. I have described one tread block with its attached plunger rod and its supporting spring, but it is to be understood that I use a plurality of tread blocks, plunger rods, springs, etc., mounted in the hollow felly of the wheel, as shown in Fig. 1.

The wheel so far described by me is made entirely of metal plates bolted together so as to form a disk-like wheel, but my invention is clearly applicable to a wheel, the hub and spokes of which are constructed of wood in the ordinary manner. Such a wheel is shown in Figs. 5 and 6. In this construction, 8 designates the usual wooden hub provided with the radiating spokes 9, and 10 designates a wooden rim into which the extremities of the spokes project and are securely fastened. This wooden rim projects out on each side beyond the spokes, as shown in Fig. 6. 11 designates the opposed casing plates which correspond with the casing plates 5 in the previous description. These casing plates are annular and are bolted on their inner margins by bolts 111 to the rim 10. The outer margins of the casing plates 11 are inwardly turned, as at 112, and to the face of the hollow felly thus formed is attached the channel iron 6, of the same character as that previously described, having partitions 64 and an opening 65. 7× designates a tread block of the kind previously described, inclosed within a three-sided metallic casing 71, 72 designating the screws holding the casing to the tread block. The spindle 13 projects from said block, as previously described, and into a longitudinal passage 78 formed in the end of each spoke 9. Attached to the spindle 73, is the head 76 which bears against the coiled spring 77 which at its lower end bears against the rim 10. The action of both of these tires is precisely the same. As the wheel rolls over the ground, the tread sections will be forced inward against the tension of the springs 77. As soon as the pressure upon any particular tread block has been relieved, the spring will force the tread block outward to its original position.

It will be seen that wheels constructed in accordance with my invention, while rigid, as regards the body of the wheel, have a resilient tread section which will yield sufficiently to take up all jars and shocks, and which is yet unpuncturable and very little liable to damage.

It will be seen from Figs. 1 and 3, that the faces of each tread block project over the sides of the casing 71. Not only does this prevent the edge of the casing from coming into contact with the ground, or with stones on the roadway, and thereby becoming dented and deformed, but it brings the edges of the faces of the tread blocks closely contiguous to each other. The bodies of the tread blocks, however, are sufficiently far apart so that stones or dirt picked up between the tread blocks will be pushed upwardly into the enlarged space between the bodies of the tread blocks, and will fall out therefrom.

Having thus described the invention, what I claim is:—

1. A wheel of the character described having a felly composed of two opposed plates spaced from each other, the outer margins of the plates being inwardly turned, an annular U-shaped channel iron supported on the inwardly turned margins of the felly plates and divided into a plurality of compartments, the floor of each compartment being formed with a perforation, a tread block carried in each of the said compartments, a plunger spindle attached to the tread block and projecting into the hollow felly, said spindle having a head intermediate of the ends of the spindle, a bearing member located in the hollow felly through which said plunger passes, coiled springs carried within the hollow felly, each spring surrounding one of the plunger spindles and bearing at one end against the head to force the tread block outward and at its other end bearing against said bearing member.

2. A wheel of the character described having a hollow felly composed of two opposed and separated plates, the outer margins of the plates being inwardly turned, a member carried between the inner margins of the felly plates to hold the felly plates in spaced relation and to form a floor for said felly, said member having a plurality of perforations, an annular channel iron surrounding the felly and having outwardly turned flanges on its under face engaged with the inwardly turned flanges of the felly plates, bolts fastening the channel iron to the felly plates, said channel iron being divided into a series of compartments, a plurality of tread blocks located one in each of said compartments, a plunger spindle for each tread block projecting through the channel iron and into the hollow felly and into the member forming the floor thereof, a head fixedly mounted upon the middle of the plunger spindle, and a coil spring bearing at one end against the floor of the felly and at the other end bearing against the said middle head of the spindle to force the spindle and tread block outward.

3. A wheel of the character described, comprising a hub having an annular flange, opposed plates attached on each side of the flange, said plates being inwardly turned toward each other at their outer margins, opposed annular plates surrounding said first named plates and bolted thereto and forming the middle section of a wheel, a hollow felly composed of two opposed separated annular plates, the inner margins of which are bolted to the first named annular plates, the outer margins of the felly plates being inwardly turned toward each other, an annular channel iron surrounding the hollow felly and having outwardly turned flanges on its lower face engaged with the inwardly turned margins of the felly plates, said channel iron being divided into a series of compartments, and a plurality of tread blocks, one for each of the compartments, each tread block comprising an outer casing and an inner filling extending beyond the outer casing and forming a tread surface, a plunger spindle attached to the casing and extending through the bottom of the channel iron and into the hollow felly, and a series of coiled springs located in the hollow felly, each spring surrounding one of the plunger spindles and forcing it outward.

4. A wheel of the character described, comprising a hub having an annular flange, opposed plates attached on each side of the flange, opposed annular plates surrounding said first named plates and bolted thereto and forming the middle section of a wheel, a hollow felly attached between the last named annular plates, an annular channel iron mounted upon the outer rim of the felly and divided into a series of compartments, a tread block carried in each of said compartments, a spindle attached to each of said tread blocks and projecting through the compartment, through the rim of the hollow felly and into the latter, and a spring located within the hollow felly and acting against the spindle to force the tread-block outward.

5. A wheel of the character described, comprising a hub having an annular flange, opposed plates attached on each side of the flange, the outer margins of said plates being inwardly turned toward each other, opposed annular plates surrounding said first named plates and attached thereto and forming the middle section of a wheel, a hollow felly composed of two opposed separated annular plates, the inner margins of which are bolted to the last named annular plates, an annular channel iron surrounding the hollow felly and attached thereto, a transverse annular plate mounted within the hollow felly near the inner end thereof and forming means for holding the felly plates in spaced relation to each other, and a plurality of tread blocks located within said channel iron, a plunger spindle attached to each tread block, and extending through the bottom of the channel iron into the hollow felly and through the transverse plate therein, and a series of coil-springs located in the hollow felly, each spring surrounding one of the spindles and following it outward, the springs being supported upon said transverse plate.

In testimony whereof I affix my signature in presence of two witnesses.

JOHN B. ADAMS. [L. S.]

Witnesses:
FLORENCE PLUMMER,
RAY. D. VITTUM.